United States Patent
Schwitters et al.

(10) Patent No.: US 9,898,714 B2
(45) Date of Patent: Feb. 20, 2018

(54) SYSTEM AND METHOD FOR A DIRECT SOCIAL NETWORK

(75) Inventors: Chad Schwitters, Redmond, WA (US); Andy Kispert, Kirkland, WA (US); Andy Peterson, Snohomish, WA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 818 days.

(21) Appl. No.: 12/359,698

(22) Filed: Jan. 26, 2009

(65) Prior Publication Data

US 2010/0191704 A1 Jul. 29, 2010

(51) Int. Cl.
*G06F 7/00* (2006.01)
*G06F 17/00* (2006.01)
*G06Q 10/10* (2012.01)

(52) U.S. Cl.
CPC .................................. *G06Q 10/10* (2013.01)

(58) Field of Classification Search
CPC .............. G06F 17/30; G06F 17/30702; G06F 17/30265; G06F 17/30017; G06F 17/30864; G06Q 10/10; G06Q 30/02; H04W 4/206; H04W 4/023; H04W 12/02
See application file for complete search history.

(56) References Cited

U.S. PATENT DOCUMENTS

| 7,693,542 B2 | 4/2010 | Mauney et al. |
| 8,285,810 B2 * | 10/2012 | Svendsen et al. ............ 709/217 |
| 2005/0209999 A1 * | 9/2005 | Jou .................................. 707/2 |
| 2007/0192299 A1 * | 8/2007 | Zuckerberg et al. ............ 707/3 |
| 2008/0114834 A1 * | 5/2008 | Miyazaki ...................... 709/204 |
| 2008/0125148 A1 * | 5/2008 | Zhao et al. ................... 455/466 |
| 2008/0133658 A1 * | 6/2008 | Pennington ................... 709/204 |
| 2009/0030985 A1 * | 1/2009 | Yuan ............................. 709/204 |
| 2009/0132655 A1 * | 5/2009 | Behrens ........................ 709/204 |
| 2009/0209286 A1 | 8/2009 | Bentley et al. |
| 2009/0222519 A1 * | 9/2009 | Boyd ............................ 709/204 |
| 2009/0271656 A1 * | 10/2009 | Yokota et al. ................... 714/6 |
| 2009/0328205 A1 * | 12/2009 | Ims et al. ........................ 726/22 |
| 2010/0015976 A1 * | 1/2010 | Issa et al. .................. 455/435.1 |
| 2010/0017455 A1 * | 1/2010 | Svendsen et al. ............ 709/202 |
| 2010/0057732 A1 * | 3/2010 | O'Sullivan et al. ............. 707/6 |
| 2010/0125599 A1 * | 5/2010 | Cheng et al. ................. 707/771 |
| 2010/0131265 A1 * | 5/2010 | Liu et al. .......................... 704/9 |
| 2010/0144318 A1 * | 6/2010 | Cable ......................... 455/412.1 |

* cited by examiner

*Primary Examiner* — Azam Cheema
(74) *Attorney, Agent, or Firm* — RMCK Law Group, PLC

(57) ABSTRACT

A system for a direct social network comprises a first device and a second device. The first device of the social network includes a first contact list. The first contact list includes a first plurality of users. The second device of the social network includes a second contact list. The second list includes a second plurality of users. The first device directly requests data from the second device when a user of the second device is one of the first plurality of users. The second device transmits the requested data when the user of the first device is one of the second plurality of users.

14 Claims, 2 Drawing Sheets

SYSTEM AND METHOD FOR A DIRECT SOCIAL NETWORK

FIELD OF THE INVENTION

The present invention relates generally to a system and method for a direct social network. Specifically, a direct social network enables a first device to directly access local data of a second device to exchange data.

BACKGROUND

A social network is a social structure made of nodes that are tied by one or more specific types of interdependency such as values, visions, ideas, financial exchange, friendship, kinship, etc. The nodes of the social network may represent an entity such as a user, an organization, or devices used thereby. If a first node represents a user, adjacent nodes may represent entities that are directly linked to the user. For example, adjacent nodes may be contacts of the user. The social network enables a variety of functionalities for the user such as communication services with the contacts or contacts of contacts.

The social network still relies upon a third party for connectivity. That is, conventional social networks rely on existing web-based social networks for data retrieval. This reliance requires clients of the social network to deal with many difficult legal restrictions, constant refreshing of contact data, etc. Furthermore, the social network relies upon a hosting server for setups, speeds, availabilities, etc. This reliance may cause communication delays, data blackouts, etc. The reliance on the hosting server may also result in a client being provided outdated data. For example, if a client requests data from a contact when the hosting server still has not updated the data, the client will receive data that may be impertinent, in particular when location is requested. In addition, the client of the social network are precluded from having full control regarding data access from rules imposed by the hosting server or provider for the social network. Finally, conventional social networks provide services for free. However, the hosting of the social network via the hosting server incurs costs.

SUMMARY OF THE INVENTION

The present invention relates to a system and method for a direct social network. The system comprises a first device and a second device. The first device of the social network includes a first contact list. The first contact list includes a first plurality of users. The second device of the social network includes a second contact list. The second list includes a second plurality of users. The first device directly requests data from the second device when a user of the second device is one of the first plurality of users. The second device transmits the requested data when the user of the first device is one of the second plurality of users.

DETAILED DESCRIPTION

Figure 1:
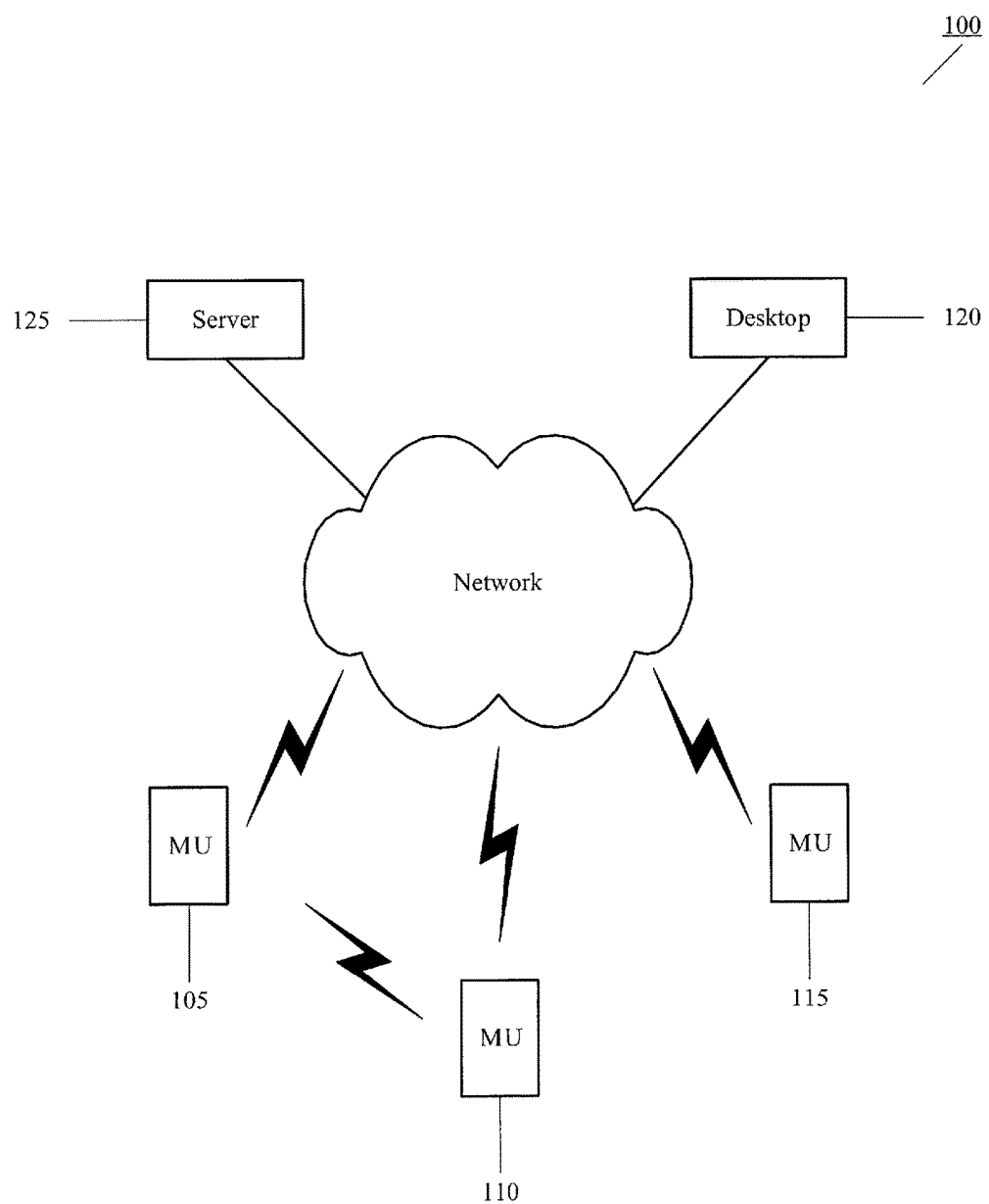
FIG. 1 shows a direct social network according to an exemplary embodiment of the present invention.

The exemplary embodiments of the present invention may be further understood with reference to the following description and the appended drawings, wherein like elements are referred to with the same reference numerals. The exemplary embodiments of the present invention describe a system and method for a direct social network. The system may include a plurality of mobile units (MUs). Each MU may be operated by a user. Each user of the social network may be connected directly or indirectly to another user of the social network. According to the exemplary embodiments of the present invention, a first MU of the social network may directly request local data from a second MU of the social network. The social network, the users, the MUs, the requests, and associated methods will be described in further detail below.

FIG. 1 shows a direct social network 100 according to an exemplary embodiment of the present invention. The direct social network 100 may be any social network that includes network devices configured to communicate with each other. According to the exemplary embodiments of the present invention, the network devices of the direct social network 100 may further be configured to request and exchange data directly from each other. As illustrated, the direct social network 100 may include a plurality of MUs 105-115, a desktop 120, and a server 125.

It should be noted that the direct social network 100 may include further network components. For example, the further network components may include conventional devices associated with a network such as a database, a router, a switch, a network management arrangement, etc. It should also be noted that the direct social network 100 may be configured to support wired connections and/or wireless connections for the network components. For example, as illustrated, the MUs 105-115 may be connected to the direct social network 100 via wireless means while the desktop 120 and the server 125 may be connected to the direct social network 100 via wired means.

The MUs 105-115 may be any portable computing device. For example, the MUs 105-115 may be personal digital assistants (PDAs), laptops, pagers, etc. Specifically, the MUs 105-115 may be Smartphones. A smartphone may be a mobile phone that is configured to perform advanced functionalities that are not conventionally found on mobile phones. As smartphones, the MUs 105-115 may use an operating system and may also be configured to add applications. According to the exemplary embodiments of the present invention, the MUs 105-115 may include an application that enables the direct connection between each other and an exchange of data therebetween. The application may use existing components of the MUs 105-115 such as a transceiver and an antenna.

It should be noted that the "direct" connection between each of the MUs 105-115 may generally refer to a first MU being capable of accessing local data of a second MU. Thus, according to the exemplary embodiments of the present invention, the first MU may connect to the second MU in a variety of ways. In a first example, the first MU may be configured to be able to directly connect to the second MU. That is, a transceiver of the first MU may communicate with a transceiver of the second MU. In a second example, the first MU may be configured to utilize a communication medium such as the network to communicate with the second MU. For example, a backbone of the network may be used for signals to be exchanged between the first and second MUs. In another example, an existing network transport (e.g., sockets, email, etc.) may be used to exchange data.

The desktop 120 may be any stationary computing device. For example, the desktop 120 may be a computer tower disposed in a user's home. The desktop 120 may include substantially similar functionalities as the MUs 105-115. The desktop 120 may also be configured to be connected to the direct social network 100 using a landline whereas the MUs 105-115 connect to the direct social network 100 using wireless means.

The server 125 may be a network component responsible for managing the direct social network 100. According to the exemplary embodiments of the present invention, the server 125 may provide the basic functionalities needed to operate the direct social network. As will be discussed below, the server 125 may provide minimal support with regard to the connections and data exchange between the users of the direct social network 100. However, it should be noted that the direct social network according to the exemplary embodiments of the present invention may operate without the server 125.

The following description of an exemplary embodiment of the present invention will assume several factors for illustrative purposes only. In the following description, the MUs 105-115 may include a contact list. The contact list may include people who are directly known or associated with a user of the MU. For illustrative purposes of the following description, it may be assumed that a user of the MU 105 has a contact list that includes a user of the MU 110. It may also be assumed that a user of the MU 110 has a contact list that includes a user of the MU 115. It may further be assumed that the user of the MU 115 has a contact list that includes a user of the desktop 120. In addition, it may be assumed that reciprocation for each of the above contact lists exist.

It should be noted that the exemplary embodiment including the MUs 105-115 is only exemplary. Those skilled in the art will understand that a direct social network may include vastly more than four users and respective devices. It should also be noted that the reciprocation for each of the contact lists is only exemplary. That is, a first user may include a second user in the first user's contact list but the second user may not include the first user in the second user's contact list. It should further be noted that, according to the exemplary embodiments of the present invention, a user may include more than one other user in the user's contact list. For example, the user of the MU 105 may have a contact list that includes the user of the MU 110 and the user of the MU 115.

According to an exemplary embodiment of the present invention, the direct social network 100 may be configured to enable the MUs 105-115 and the desktop 120 to request and receive data directly from each other. That is, the direct social network 100 may enable a data exchange independent of the server 125, in contrast to conventional social networks that require the request and data exchange to occur via a server. The direct social network 100 may include security parameters that enable a first device to receive the requested data. The security parameters may relate to permissions enabled on the device in which data is requested.

The direct social network 100 may be used in a variety of exemplary scenarios. According to a first scenario, the users of the MUs 105-115 may be in an area where location data for each user is needed. The user of the MU 105 may request location data of the MU 110. Because the contact list for the user of the MU 105 includes the user of the MU 110, such a request may be made. Because the contact list for the user of the MU 110 includes the user of the MU 105, such a request may be received. The MU 110 may further query the contact list which may indicate whether the request is permissible according to the parameters set for each contact on the contact list. If the user of the MU 105 is permitted to request the location data, the MU 110 may transmit the location data to the MU 105.

In the first scenario, the MU 115 may also request location data of the MU 110. Again, because the contact list for the user of the MU 115 includes the user of the MU 110, such a request may be made. Because the contact list for the user of the MU 110 includes the user of the MU 115, such a request may be received. However, in this instance, the MU 110 may not permit the MU 115 to request such data. Subsequently, no transmission may be made to the MU 115 and/or a message may be sent to the MU 115 indicating that the request may not be processed.

In the first scenario, the MU 105 may request location data of the MU 115. According to the exemplary embodiment of the present invention, the contact list for the MU 105 may not include the user of the MU 115. However, the MU 115 may permit location data to be transmitted to contacts of contacts. That is, if a contact of the MU 115 requests location data, the MU 115 transmits the location data. If a contact of a contact of the MU 115 requests location data, the MU 115 transmits the location data. The MU 105 may query each contact in the contact list to determine whether any of the contacts include the user of the MU 115 as a contact. Because the contact list for the MU 110 includes the user of the MU 115 as a contact, the request may be transmitted from the MU 105 to the MU 115. Thus, if the MU 115 receives the request from the MU 105, the MU 115 may transmit the location data to the MU 105.

It should be noted that the location data may be transmitted from the MU 115 to the MU 105 in a variety of ways. In a first example, the MU 110 may act as an intermediary since the MU 110 provides the connection between the MU 105 and the MU 115. In a second example, the MU 115 may directly transmit the location data to the MU 105. In a third example, the server 125 may be used as an intermediary when the MU 110 is not configured to participate as an intermediary for data exchange.

In a second scenario, the user for the desktop 120 may be a parent. Furthermore, the user of the MU 115 may be a child of the parent. The user of the desktop 120 may request location data directly from the MU 115. The application for the MUs 105-115 and the desktop 120 may include a security option that disables altering of the permission for the data exchange functionality. In this scenario, the user of the desktop 120 may be the only person with the capability of altering the permission for the data exchange functionality. The desktop 120 may also request identities of users of MUs that are within a predetermined vicinity of the MU 115. The identities may relate to users who are included in the contact list for the MU 115. In this manner, the user of the desktop 120 may be aware of a location for the user of the MU 115 and people with the user of the MU 115.

As discussed above, the server 125 may provide minimal support for the direct social network 100. In particular, the server 125 may provide a backup system for the direct social network 100. In the example described above, the server 125 may be an intermediary for data exchange for devices that are not directly associated with each other (e.g., users of the devices not in the contact lists). The server 125 may also provide a backup storage for data relating to each device in the direct social network 100. For example, data relating to each device may be stored as a backup in the direct social network on a periodic basis (e.g., every minute, every half hour, every hour, etc.). Thus, if a request for a particular type of data relating to one of the devices is made but the device is unavailable (e.g., not in communication with the network, deactivated, undesirable to connect directly, etc.), the backup data may be transmitted from the server 125. However, those skilled in the art will understand that there is a chance that the backup data may be outdated, in particular with location data. In a further example, when the MUs are part of different carrier networks, the server 125 may be configured to provide a pathway for the MUs to communicate and access the data of the other.

Figure 2:
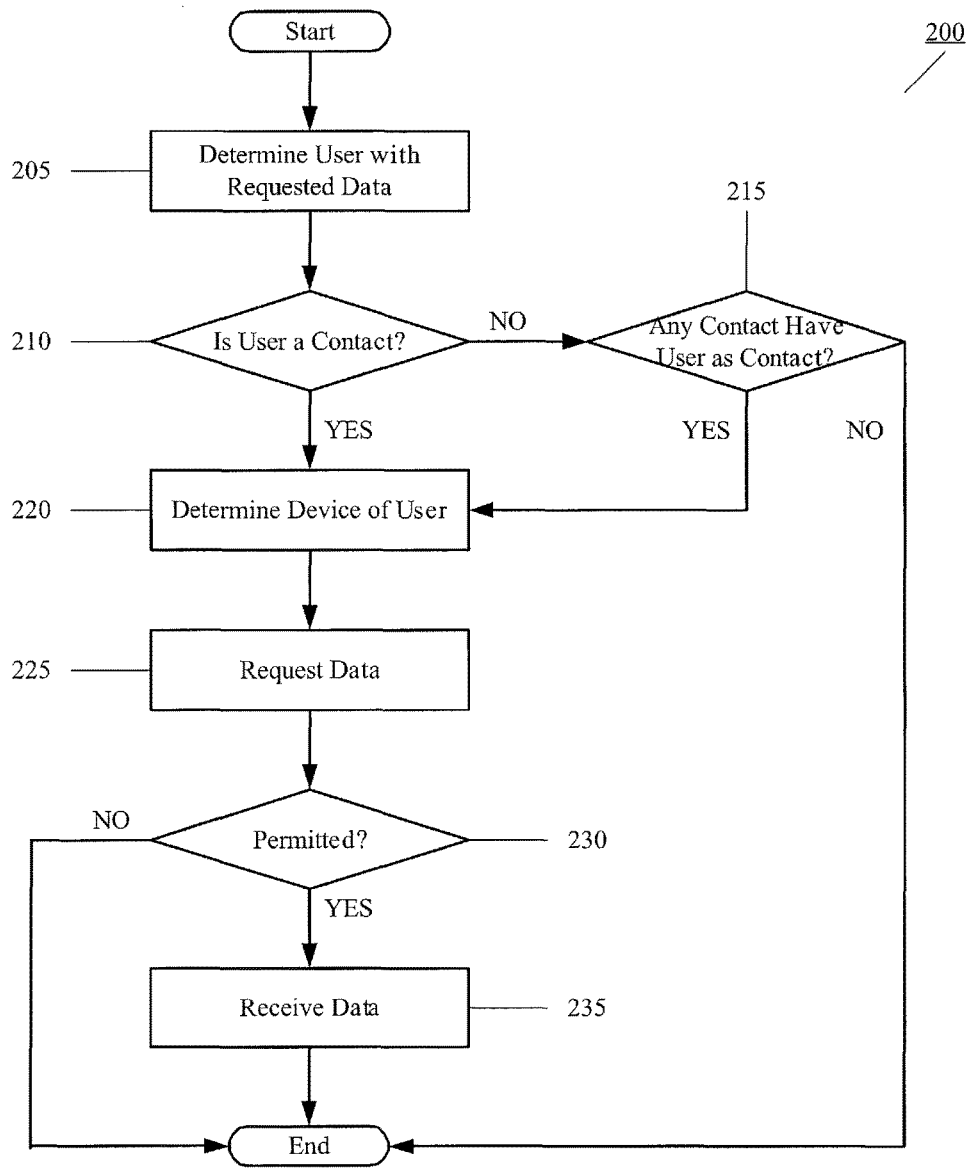
FIG. 2 shows a method for data access in a direct social network according to an exemplary embodiment of the present invention.

FIG. 2 shows a method 200 for data access in a direct social network according to an exemplary embodiment of the present invention. The method 200 may relate to a single device and a means of requesting data. The method 200 will be described with reference to the direct social network 100 of FIG. 1. Specifically, the method 200 will be described according to the MU 105.

In step 205, a user with whom the data that is requested is determined. In a first example, the MU 105 may request data for the location of the MU 110. The MU 105 may determine the user of the MU 110. In a second example, the MU 105 may request data for the location of the MU 115. The MU 105 may determine the user of the MU 115.

In step 210, a determination is made whether the user is included in the contact list of the MU 105. When the user is not in the contact list of the MU 105, the method 200 continues to step 215 where a further determination is made whether the user is included in a contact list of any contact in the contact list of the MU 105. It should be noted that the application of the MU 105 may make even further determinations to continue to check if the user is a contact for further users in further contact lists. For example, the MU 105 may determine if the user is a contact of a contact list of the MU 115. This even further determination may be made when data relating to the further MUs is available to the MU 105. For example, this data may be stored in the server 125. In another example, the contact list of further devices may be accessed directly by the MU 105 to make the determination. If step 215 determines that the user is not part of any contact list, the method 200 ends.

If step 210 or step 215 determines the user is part of a contact list, the method 200 continues to step 220 where the device of the user is determined. In the first example described above, the determined device may be the MU 110. In the second example described above, the determined device may be the MU 115. Once the device is determined in step 220, the data is requested in step 225. As discussed above, the request may be made directly from the MU 105 to the determined device or the request may be made through an intermediary such as the server 125 or the MU 110 (e.g., when the determined device is MU 115).

In step 230, a determination is made whether the MU 105 is permitted to receive the requested data. As discussed above, parameters may be set for each person in the contact list for a MU. Thus, in the first example, the MU 110 may enable the MU 105 to request selected data including location data. In the second example, because the user of the MU 105 is not in the contact list of the MU 115, the MU 115 may receive the data and proceed to use default settings regarding unknown devices. With regard to unknown devices, the MU 115 may only provide minimal data such as a name. However, the MU 115 may also be configured to determine a connection between the MU 115 and the MU 105. If the MU 115 determines that the MU 105 is a contact of the MU 110, then the MU 115 may adapt the parameters to enable the MU 105 to receive the location data if the MU 110 is permitted to receive the location data of the MU 115.

If the MU 105 is not permitted to receive the requested data, the method 200 ends. If the MU 105 is permitted to receive the requested data, the method 200 continues to step 235 where the data is received by the MU 105. As discussed above, the MU 105 may receive the data directly from the determined device (step 220) or through an intermediary.

It should be noted that the method 200 may include additional steps. For example, as discussed above, the server 125 may provide a backup storage for data relating to the devices of the direct social network 100. Thus, after step 225, a determination may be made whether the determined device (step 220) is available to transmit data. For example, if the determined device is MU 110 and the MU 110 is deactivated at the time of the request, the method 200 may proceed to a step where the server 125 is accessed to retrieve the requested data.

The exemplary embodiments of the present invention may provide a variety of functionalities for a social network. In particular, the social network may enable a direct communications link so that local data of the devices of the social network may be accessed. In this manner, an intermediary device is not required and a most current data may be requested as it is received directly from the source. Furthermore, costs associated with a server performing major functions in a conventional social network as opposed to the minimal functions in the direct social network of the present invention are avoided.

The exemplary embodiments of the present invention may include several features. For example, further types of data may be received other than location data. User profiles (e.g., name, company, title, contact information, default photo), recent photos, phone availability/status, calendar availability, file sharing, email, messaging, etc. may be other types of requested data. In another example, a query system may be implemented. The query system may include an input field such as company. The application may search the contact list of the MU to determine if any person works for the company. The application may further search the contact lists of users that are part of the MU's contact list to make the determination.

In yet another example, the applications may use a form of chat protocol to retrieve the requested data. Instead of placing permission standards for each contact or contact of contacts, when a MU is requested data, an alert may be shown so that the user may allow or disallow the requested data from being transmitted. With regard to security features, on an extreme end, the application may prevent an unknown device from connecting at all to the MU. In another end, the application may enable any device from connecting to the MU. In the middle, the application may enable an unknown device to only receive minimal data.

Those skilled in the art will understand that the above described exemplary embodiments may be implemented in any number of manners, including, as a separate software module, as a combination of hardware and software, etc. For example, the application may be a program containing lines of code that, when compiled, may be executed on a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A computer-implemented method, comprising:
   receiving, at a first computing device associated with a first user and from a second computing device associated with a second user, a request for: (i) location data corresponding to a location of the first computing device, and (ii) identity data corresponding to identities of one or more other users in a contact list of the first computing device that are within a predetermined vicinity of the location of the first computing device;

determining, at the first computing device, whether the second computing device has permission to receive the requested location and identity data; and when the second computing device has permission to receive the requested location and identity data:

receiving, at the first computing device, location data from one or more other computing devices associated with the one or more other users, respectively, the location data corresponding to one or more locations of the one or more other computing devices, respectively, wherein each particular computing device of the one or more other computing devices associated with the one or more other users automatically transmits the location data to the first computing device when the first user is included in a contact list of the particular computing device and does not transmit the location data to the first computing device when the first user is not included in the contact list of the particular computing, determining, at the first computing device, based on the location data of the one or more other computing devices, identities of the one or more other users that are within the predetermined vicinity, generating, at the first computing device, the identity data corresponding to the identities of the one or more other users within the predetermined vicinity, and transmitting, from the first computing device and to the second computing device, the requested location and identity data.

2. The method of claim 1, further comprising requesting, at the first computing device, the location data from the one or more other computing devices associated with the one or more other users.

3. The method of claim 1, wherein the first computing device receives the location data directly from the one or more other computing devices without involvement of a separate server computing device.

4. The method of claim 1, wherein the second user is permitted to alter the permission to receive the requested location and identity data at the first computing device via the second computing device.

5. The method of claim 4, wherein the first user is not permitted to alter the permission.

6. A first computing device associated with a first user, comprising:

one or more processors; and a non-transitory computer readable storage medium including a set of instructions that, when executed by the one or more processors, cause the first computing device to perform operations comprising:

receiving, from a second computing device associated with a second user, a request for: (i) location data corresponding to a location of the first computing device, and (ii) identity data corresponding to identities of one or more other users in a contact list of the first computing device that are within a predetermined vicinity of the location of the first computing device;

determining whether the second computing device has permission to receive the requested location and identity data; and when the second computing device has permission to receive the requested location and identity data:

receiving location data from one or more other computing devices associated with the one or more other users, respectively, the location data corresponding to one or more locations of the one or more other computing devices, respectively, wherein each particular computing device of the one or more other computing devices associated with the one or more other users automatically transmits the location data to the first computing device when the first user is included in a contact list of the particular computing device and does not transmit the location data to the first computing device when the first user is not included in the contact list of the particular computing, determining based on the location data of the one or more other computing devices, identities of the one or more other users that are within the predetermined vicinity, generating the identity data corresponding to the identities of the one or more other users within the predetermined vicinity, and transmitting, to the second computing device, the requested location and identity data.

7. The first computing device of claim 6, wherein the operations further comprise requesting the location data from the one or more other computing devices associated with the one or more other users.

8. The first computing device of claim 6, wherein the first computing device receives the location data directly from the one or more other computing devices without involvement of a separate server computing device.

9. The first computing device of claim 6, wherein the second user is permitted to alter the permission to receive the requested location and identity data at the first computing device via the second computing device.

10. The first computing device of claim 9, wherein the first user is not permitted to alter the permission.

11. A non-transitory computer readable storage medium including a set of instructions that, when executed by one or more processors of a first computing device associated with a first user, cause the first computing device to perform operations comprising:

receiving, from a second computing device associated with a second user, a request for: (i) location data corresponding to a location of the first computing device, and (ii) identity data corresponding to identities of one or more other users in a contact list of the first computing device that are within a predetermined vicinity of the location of the first computing device;

determining whether the second computing device has permission to receive the requested location and identity data; and when the second computing device has permission to receive the requested location and identity data:

receiving location data from one or more other computing devices associated with the one or more other users, respectively, the location data corresponding to one or more locations of the one or more other computing devices, respectively, wherein each particular computing device of the one or more other computing devices associated with the one or more other users automatically transmits the location data to the first computing device when the first user is included in a contact list of the particular computing device and does not transmit the location data to the first computing device when the first user is not included in the contact list of the particular computing, determining based on the location data of the one or more other computing devices, identities of the one or more other users that are within the predetermined vicinity, generating the identity data corresponding to the identities of the one or more other users within the predetermined vicinity, and transmitting, to the second computing device, the requested location and identity data.

12. The non-transitory computer readable storage medium of claim 11, wherein the operations further comprise requesting the location data from the one or more other computing devices associated with the one or more other users.

13. The non-transitory computer readable storage medium of claim 11, wherein the first computing device receives the location data directly from the one or more other computing devices without involvement of a separate server computing device.

14. The non-transitory computer readable storage medium of claim 11, wherein the second user is permitted to alter the permission to receive the requested location and identity data at the first computing device via the second computing device, and wherein the first user is not permitted to alter the permission.

* * * * *